United States Patent [19]

Price

[11] Patent Number: 4,801,114
[45] Date of Patent: Jan. 31, 1989

[54] RETRACTABLE SELF-LEVELING LEG ASSEMBLY

[75] Inventor: Daniel R. Price, Big Lake, Minn.

[73] Assignee: White Consolidated Industries, Inc., Cleveland, Ohio

[21] Appl. No.: 204,679

[22] Filed: Jun. 9, 1988

[51] Int. Cl.⁴ ............................................. F16M 11/24
[52] U.S. Cl. .................................. 248/188.3; 312/255
[58] Field of Search ................ 248/188.3, 649, 188.2, 248/446, 677; 312/249, 253, 250, 255; 182/202, 203, 204, 205, 200

[56] References Cited

U.S. PATENT DOCUMENTS

| | | | |
|---|---|---|---|
| 520,432 | 5/1894 | Humphreys | 248/188.3 |
| 2,544,822 | 3/1951 | Brown | 312/249 |
| 3,186,670 | 6/1965 | Perl | 248/188.2 |
| 3,222,021 | 12/1965 | Sisler | 248/188.3 |
| 3,304,032 | 2/1967 | Yates | |
| 3,724,895 | 4/1973 | Brand | 248/188.2 X |
| 3,923,356 | 12/1975 | Washburne | 312/255 X |
| 4,192,564 | 3/1980 | Losert | 248/188.3 X |
| 4,262,870 | 4/1981 | Kretchman | 248/188.3 |

*Primary Examiner*—J. Franklin Foss
*Attorney, Agent, or Firm*—Pearne, Gordon, McCoy & Granger

[57] ABSTRACT

A self-leveling leg assembly for use as the rear legs of a household appliance includes a pair of legs at each rear corner rigidly interconnected by a bar. Each leg carries a projecting pin which fits within a slot and a bracket at each corner, with the slots in both brackets sloping upwardly and outwardly toward the outer wall of the appliance. One of the brackets includes a horizontal slot connected to the top portion of the diagonal slot and positioned so that when the adjacent leg pin is moved from the diagonal slot into the horizontal slot and the other leg pin is at the bottom of its slot, movement of the other leg pin toward the top of its slot causes the one leg pin to move to the inner end of the horizontal slot. A spring-biased locking pin is positioned in the horizontal slot so that when the appliance is lifted off a shipping pallet with both legs in the retracted position, the other leg can fall to the bottom of its slot as the spring-biased locking pin pushes the one leg pin toward the end of the horizontal slot and allows it to drop into the diagonal slot. The locking pin remains in this position to prevent reentry of the pin from the diagonal slot portion into the horizontal slot portion, so that the legs remain in the extended position.

11 Claims, 6 Drawing Sheets

RETRACTABLE SELF-LEVELING LEG ASSEMBLY

BACKGROUND OF THE INVENTION

This invention relates generally to self-leveling supports, and in particular to self-leveling support assemblies for household appliances such as washing machines.

Household appliances of many kinds are generally required to be supported in a level position for proper operation. Because many floor surfaces are not flat and level, it is generally necessary to provide leveling means at each corner of the appliance. Since the appliance must generally be supported at each of the four corners of the base, one approach to provide such support is to use screw-type legs threaded into the base at each of the four corners so that the legs may be raised and lowered individually to level the appliance and provide sufficient support at each corner.

The problem is particularly acute in the case of washing machines, not only because they are relatively heavy and undergo strong vibrating forces which can become quite high when the washing machine is in the spin mode, but also because they are generally used on particularly uneven floors, suchas in a basement or utility room, where the floors are intentionally sloped to provide for proper drainage. Furthermore, the leveling problem is complicated by the fact that in many locations, a washing machine, in particular, is so positioned that the rear legs are not easily accessible for leveling purposes, and it is therefore sometimes necessary to move the washing machine in and out of the position between trial adjustments until proper extension of the rear legs is achieved.

To overcome this problem, it has been proposed to make some of the legs, and in particular the two rear legs, of a washing machine remotely adjustable from the front of the machine or to provide a self-leveling arrangement in which the extension of the two rear legs can be automatically compensated for when the machine is leveled by the front screw-adjusted legs alone. One such arrangement is shown in U.S. Pat. No. 3,304,032, where the two rear legs are rigidly interconnected by a center section, and the unit then secured to the machine frame, using a pin and angled slot arrangement. With this construction, a certain amount of self-leveling is achieved by the interconnection between the two rear legs, so that as one leg may be raised, the other one is automatically extended. Thus, when the machine is put on a surface that slopes downwardly toward one side or the other of the machine, the two rear legs will remain in contact with the floor and support the rear of the machine at both rear corners, and the transverse leveling, as well as the front-to-back leveling, is then accomplished entirely by two screw legs at the two front corners of the washing machine. Such an arrangement has generally proven satisfactory for leveling purposes, but requires that the total height of the machine when shipped be increased by the average extension of the two legs, which is variable only as to each other and not as to the total height of the machine. Since this arrangement increases the height of the machine when shipped, and therefore requires greater space, it is often proposed that the entire mechanism be rmeoved during shipment and reinstalled only before the machine is installed at its place of operation.

One method of overcoming the above problem regarding shipping is shown in U.S. Pat. No. 4,262,870, in which the legs are made with a mechanism that allows them to be stored in a retracted position to allow minimum height of the washing machine, and for installation a retaining mechanism is removed to allow the legs, if the back of the machine is raised, to move downwardly into an operating position, where they may be automatically reconnected together to provide a leveling action similar to that disclosed in U.S. Pat. No. 3,304,032. However, the mechanism of the latter-mentioned patent becomes complex and expensive, requiring a plurality of parts and a spring action to allow the extension and interlocking of the legs when the machine in unpacked and prior to installation.

SUMMARY OF THE INVENTION

The present invention provides an improved and simplified retractable self-leveling leg arrangement that is particularly adapted to be applicable to the rear legs of a washing machine or similar appliance. The machine is provided with a bracket at each rear corner within which is formed a diagonal slot which slopes upwardly and outwardly toward the outer side of the machine. A rigid leg member comprises a vertical leg and an integral interconnecting crossbar. Each of the legs carries a projecting pin member arranged to slide within the adjacent diagonal slot. Thus, the two legs provide a self-leveling action, since as one leg moves up or down within the diagonal slot, the rigid connection and pin on the other leg require that the other leg move down or upwardly on a compensating basis because of the fixed spacing between the pins, which is generally such that the legs have the same amount of vertical extension when each pin is at the midpoint of its respective slot.

In order to allow retraction of the mechanism for shipping, one of the brackets has a transverse slot extending inwardly from the upper end of the diagonal slot. With this arrangement, when the pin in this bracket is moved to the upper end of its slot and the pin at the other bracket is moved to the lower end of its slot at the fully extended position, that other leg can then move upwardly with the pin in its diagonal slot to the upward position as the pin in the one bracket then moves horizontally inwardly in the transverse portion of the upper slot. With this arrangement, the two legs can be arranged in a position for shipping in which both legs are retracted.

This arrangement can be made self-extending by means of a spring-biased pin which is also mounted in the horizontal slot on the one bracket. When the machine is raised, the spring biases the second pin toward the outer end of the horizontal slot so that the pin secured to the leg may then enter the diagonal poriton of the slot and move to a lower level as the pin in the other bracket has moved downwardly under the force of gravity as the other leg moves to its lowermost position. When this is done, the two legs are extended to their operating position, while the spring-biased pin remains at the junction of the diagonal and horizontal slots in such a position that the pin on the leg in the one bracket cannot rise to a point where it might reenter the horizontal slot, which would result in a collapsing of the legs. Thus, while the machine can be shipped with the legs in a retracted or upward position, it is only necessary to lift the machine off the shipping skid so that the leg assembly will move downward as a result of the force of gravity on the other leg and the biasing force of the spring-loaded pin on the one leg. Then after the one leg has its pin entering the diagonal slot, reentry into the horizontal slot is blocked and the legs may be retracted only by manually moving the spring-loaded pin back to the inner end of the horizontal slot and moving the leg structure in such a way that the leg assembly will move to the upward or retracted position.

DETAILED DESCRIPTION OF THE PREFERRED EMBODIMENT

Figure 1:
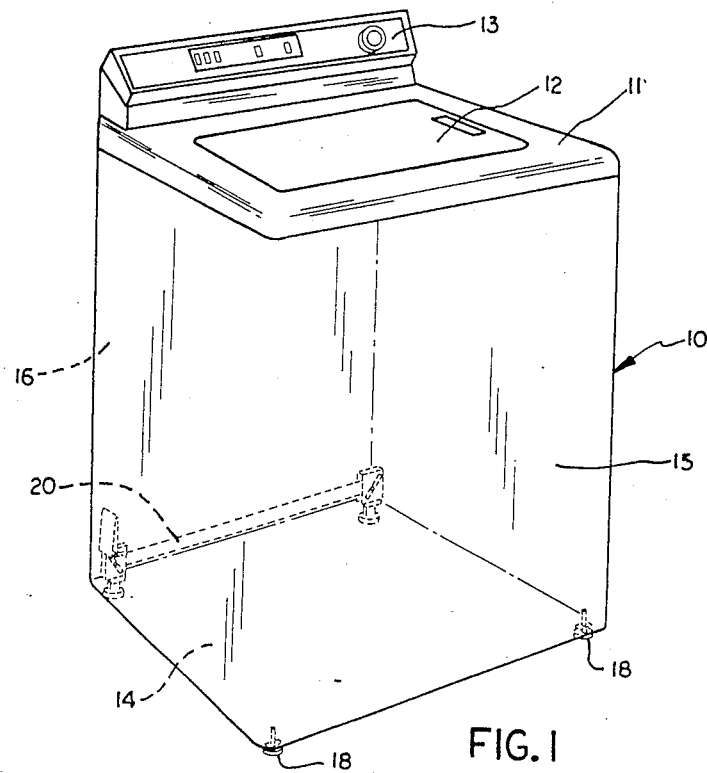
FIG. 1 is a perspective view of a washing machine showing in phantom the location and mounting of a self-leveling assembly according to the preferred embodiment of this invention.

Referring to the drawings in greater detail, FIG. 1 shows a top loading washing machine 10 having a top panel 11 containing a hinged door 12 for access to the interior and a back guard 13 on which the controls are mounted. The washing machine 10 has a hollow, box-like, rectangular cabinet including side walls 15 and a back wall 16, all of which overlie a base or bottom wall 14 which serves as a support for the mechanism within the cabinet. The mechanism of the washing machine includes a tube (not shown) mounted for rotation about a vertical axis and which, during spin, is driven at a high rotational speed which can transfer forces to the base 14, which may tend to cause the washign machine to move about on surfaces unless the base 14 is positioned to be level and supported at all four corners.

To provide this leveling, adjustable legs 18 are provided at each of the front corners, and these legs conventionally include a slip-resistant pad and are threaded into the base so that by rotation they may be moved vertically to ensure proper engagement with the floor when the base 14 is level. To provide leveling at the back, which is often inaccessible when the washing machine is installed in place, there is provided a rear leveling leg assembly 20 in accordance with the present invention.

The leveling leg assembly 20 includes a first bracket 21 at one rear corner and at the other corner a second bracket 22, which is a control bracket and is different from the first bracket 21. These brackets 21 and 22 are secured to the base 14 at each rear corner, and serve to support the leveling legs, as described in greter detail hereinafter.

The first bracket 21 includes a pair of parallel, spaced vertical walls 25 joined together at the upper end by an integral top wall 26 having an opening 28 therein to allow vertical movement of the leveling leg. At the bottom end, the walls 25 terminate in a pair of integral, laterally extending flanges 27 which are secured to the bottom wall or base 14 by suitable means, such as welding, or by screw fasteners. The bracket is so oriented that the parallel, vertically extending walls 25 are also parallel to the front and back walls of the washing machine 10. The walls 25 also define a pair of aligned slots 29 in the front and back sides which extend at an angle from the bottom upwardly and outwardly toward the side wall of the cabinet. The slots 29 are formed with integral flanges 31 along the edges to serve as bearing surfaces, as described hereinafter.

The second or control braket 22 is similar to the first bracket 21, except the slot arrangement and its related mechanism. Thus, the bracket 22 includes a pair of upstanding parallel walls 35 connected together by an integral top wall 36 having an opening 38 therein for clearance purposes. At its lower end, the walls 35 terminate in outwardly extending flanges 37 by which the bracket is mounted directly on the base or bottom wall 14 by means of welding or suitable threaded fasteners. The walls 35 define a slot 39 which is a mirror image of the slot 39 in bracket 21, in that the slot 39 extends upwardly and outwardly toward the adjacent side wall of the cabinet so that the two slots 29 and 39 and the brackets 21, 22 can be viewed as diverging upwardly and outwardly away from each other. The slot 39 also includes bearing flanges 41 along its edges in a manner similar to the flanges 31 on bracket 21.

The bracket 22 also includes a horizontal slot 43 located above the upper end of the slot 39 and the slot 43 terminates at an inner end 44 at the end toward the other bracket 21 and an outer end 45 where it is joined by a vertical connecting portion 46 to the upper end of slot 39. Thus, the slots 39 and 43 provide a continuous path from the inner end 44 to the outer end 45, down through the connecting portion 46 to the angled slot 39.

The first bracket 21 is positioned on the base 14 above the leg-receiving opening 49, and an elongated leg 51 is positioned between the walls 25 with a support pad 52 at its lower end below the base 14. The upper end 53 of leg 51 extends upwardly adjacent the top wall 26 and may, in fact, pass through the opening 28 when the leg is fully retracted. The position of the leg 51 within bracket 21 is determined by a crosspin 54 which is rigidly secured to the leg 51 and projects on both sides to fit within the slots 29, so that as the leg 51 moves vertically with respect to the bracket 21, it also must move inwardly or outwardly along the diagonal path defined by slot 29.

The second bracket 22, located on the other rear corner of the base 14, is also positioned above a leg-receiving opening 55 in the base and has a leg 56, similar in construction to leg 51, positioned between the vertical side walls 35. Leg 56 also includes a support pad 57 positioned below the base 14 and an upper end 58 which may, at the uppermost level of leg 56, extend through the opening 38. A crosspin 59 is rigidly secured to leg 56 to fit within the slots 39 and 43, as described in greater detail hereinafter. The two legs 51 and 56 are rigidly connected together by a connecting bar 61 having one end 62 fixedly secured, by suitable means such as welding, to the leg 51 and the other end 63 likewise rigidly secured to the leg 56. Thus, the connecting bar 61 and the legs 51 and 56 form a rigid member movable as a unit while holding the crosspins 54 and 59 a fixed distance apart with respect to the brackets 21 and 22.

The mechanism for automatically extending the legs when the washing machine is lifted off the shipping pallet is mounted on the second or control bracket 22 and includes a lock pin 66 which is positioned within the horizontal slot 43. The operation of the lock pin 66 is controlled by means of a hairpin-type spring 68 having an outer vertically extending leg 69, with an inturned end 70 fitting within a notch 71 formed on the bracket walls 35. The spring 68 also has an integral inner leg 72 extending downwardly toward the top wall 36, and having ends 74 extending on each outer side of the walls to encircle and closely engage the projecting ends of the lock pin 66. It will be understood that the spring legs 69 and 72 are joined together at a bight 76 at the top and are normally biased so that the legs 69 and 72 are closely adjacent so that the lock pin 66 is biased toward the outer end 45 of the horizontal slot 43.

Figure 8:
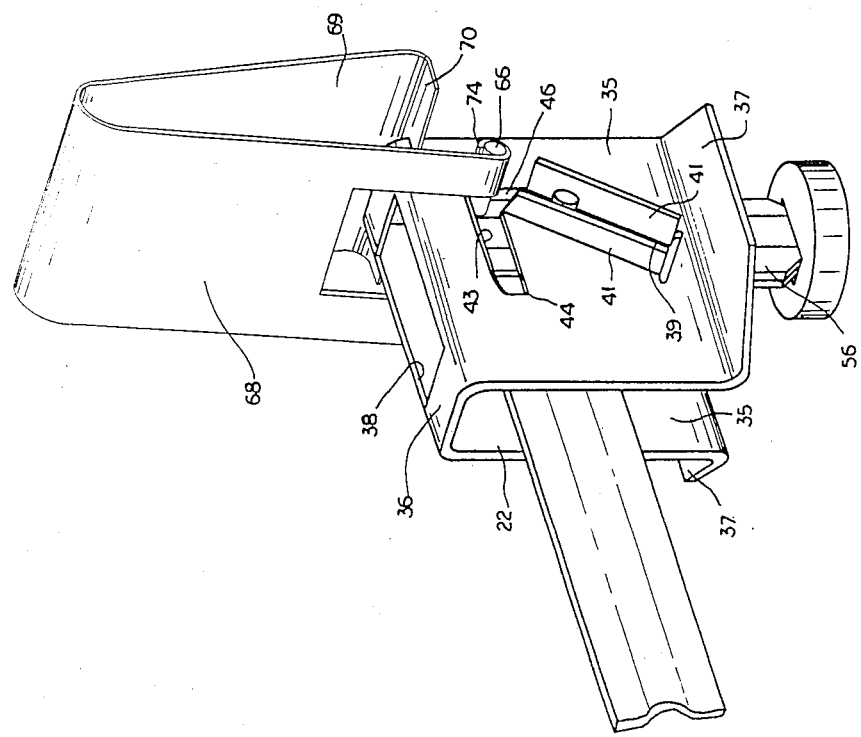
FIG. 8 is a perspective view of the leg assembly, with the legs in an equally extended position.
Figure 8:
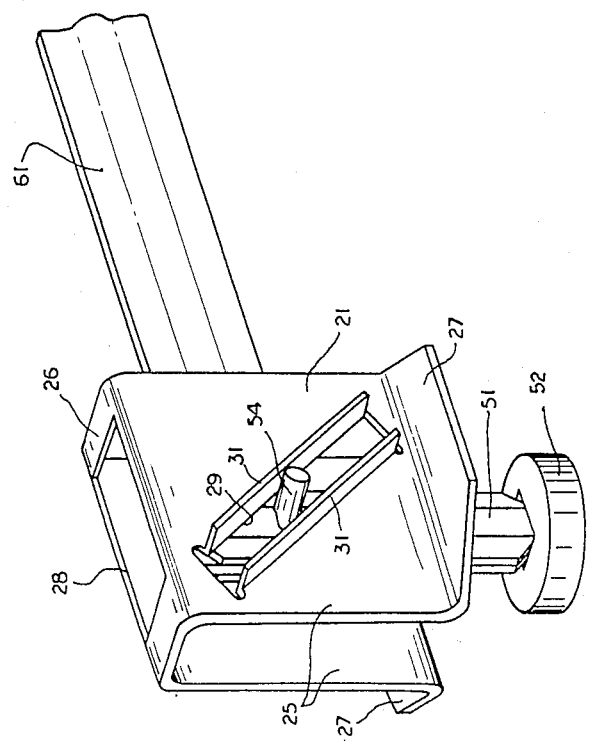
Figure 9:
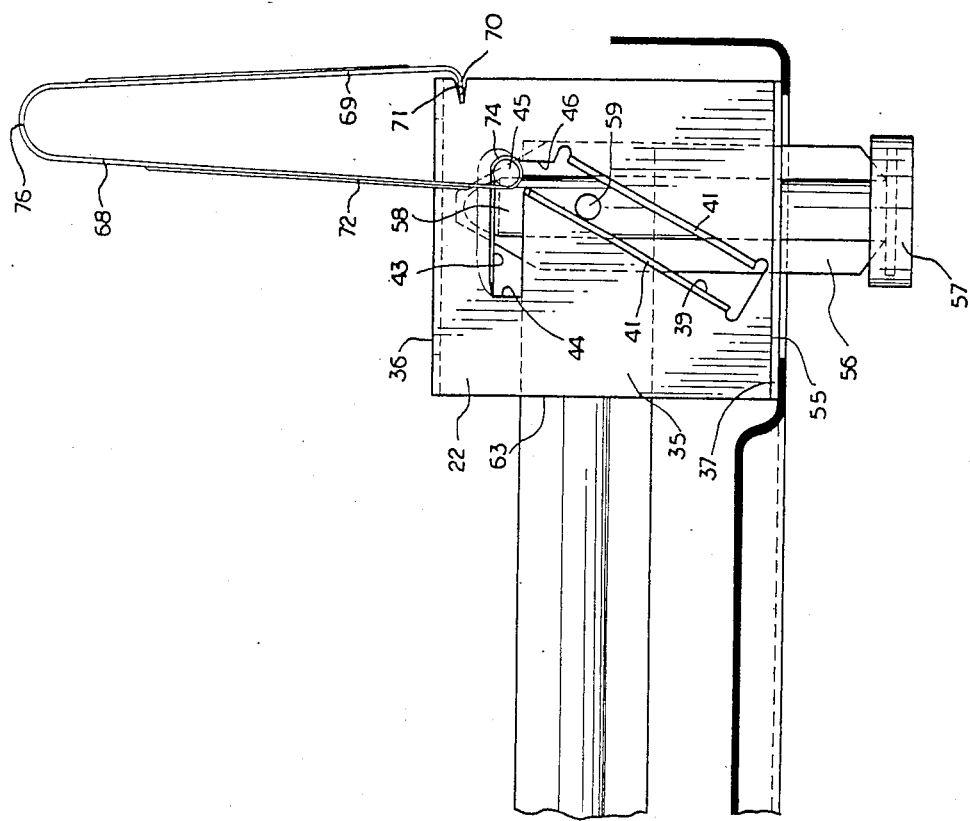
FIG. 9 is an enlarged, elevational view showing the legs in the same position as FIG. 8.
Figure 9:
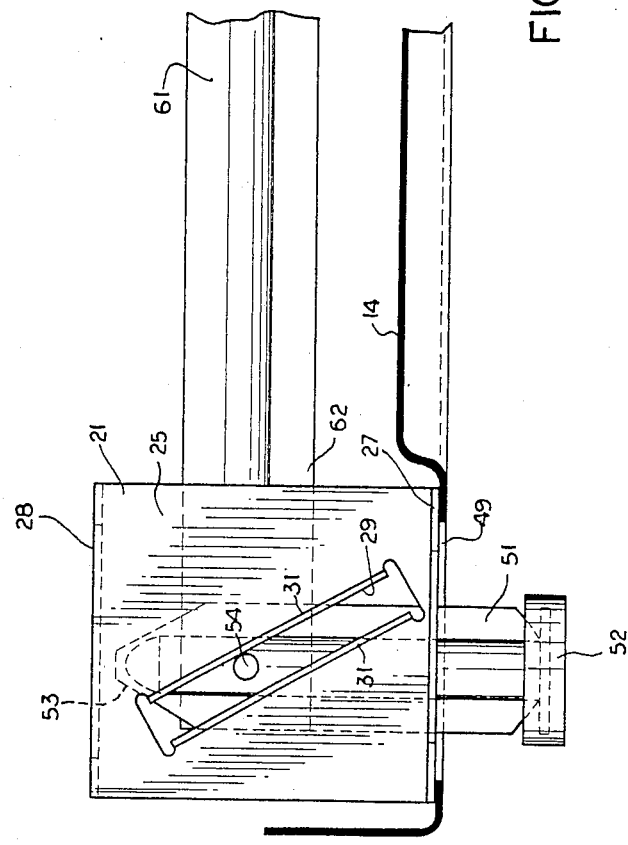
Figure 10:
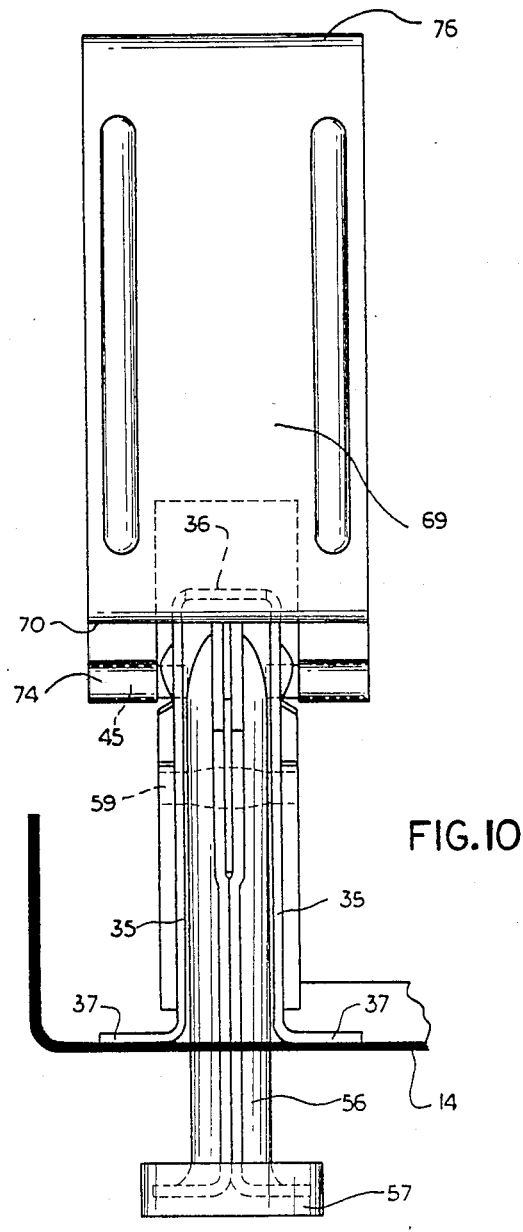
FIG. 10 is an enlarged end elevation of the mechanism as mounted on the base of a washing machine.

The operation of the legs can now be described in greater detail. As best shown in FIGS. 8 and 9, the position of the legs 51 and 55, as determined by the spacing between the crosspins 54 and 59, is such that when the legs are equally extended, the pins 54 and 59 will assume a position about two-thirds of the way up the angled slots 29 and 39 away from the base 14. Since the pins 54 and 59 rest on the flanges 31 and 41, there can be a substantial area of contact between the pin and the bracket to support the weight of the washing machine without excessive stress.

Figure 3:
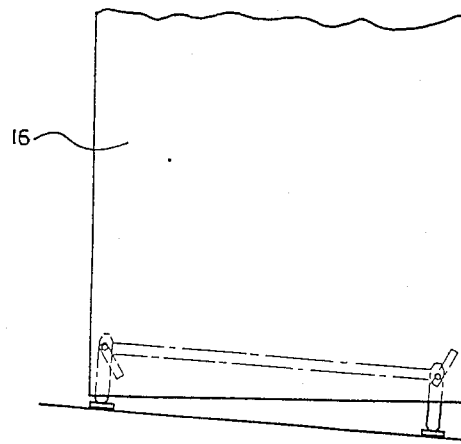
FIG. 3 is a figure similar to FIG. 2 showing the mounting of the machine on a floor sloping in one direction.
Figure 4:
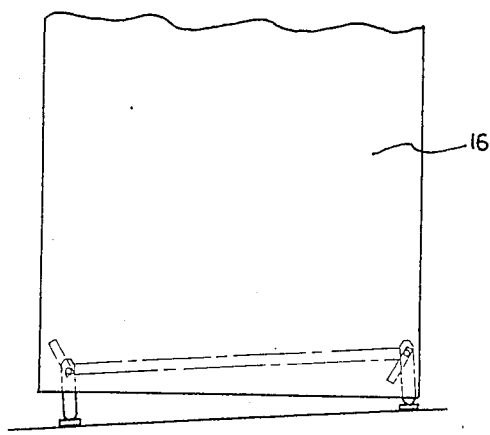
FIG. 4 is a figure similar to FIGS. 2 and 3, showing the mounting of the machine on a floor sloping in the opposite direction.
Figure 2:
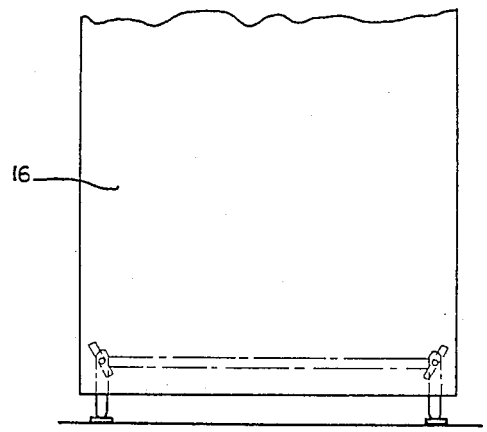
FIG. 2 is a schematic view of the leg assembly as the washing machine would be supported on a level floor.

The self-leveling effect is best shown in FIGS. 2, 3, and 4, where it can be seen that where the floor slopes in one direction, the leg on the low side automatically extends to make contact with the floor. As this pin drops downward in the slot, correspondingly, at the other bracket, the other leg must rise to have the pin rise up in the slot because of the fixed distance between the pins as provided by the rigid connecting bar 61. Thus, if the washing machine is leveled solely by extending the two front screw-adjustable legs 84, the rear leg assembly 20 will automatically compensate for a sideways slope of the floor by extending one leg or the other sufficiently that both legs engage the floor. Since the average position of the two rear legs is determined by the connecting bar 61, the unevenness is distributed only laterally between the legs, and any front-to-rear unevenness requires leveling solely by the use of the front legs 18.

Figure 5:
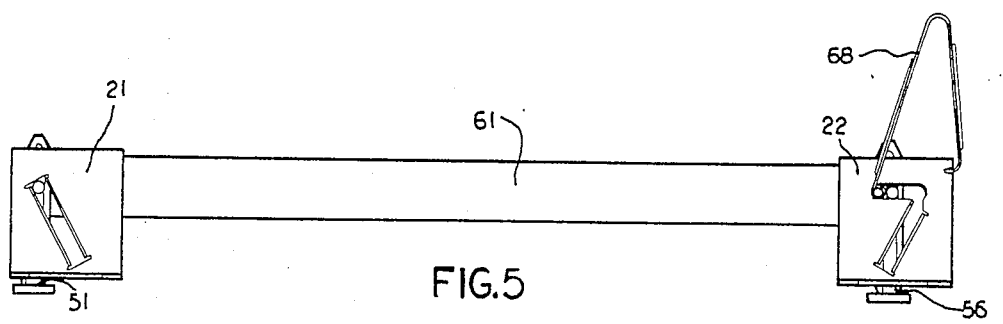
FIG. 5 is an enlarged, elevational view of the mechanism, with the legs in the retracted position.
Figure 6:
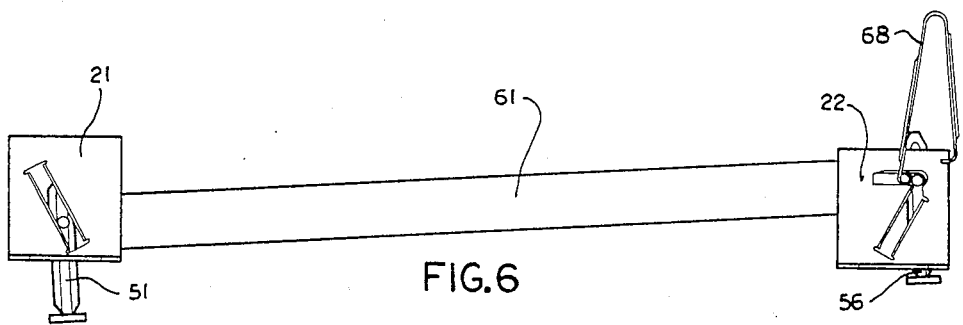
FIG. 6 is a view similar to FIG. 5, with the mechanism in a position just prior to complete extension.
Figure 7:
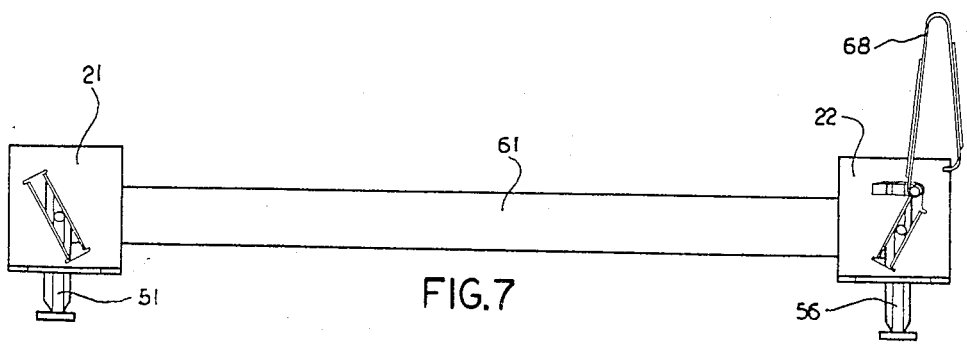
FIG. 7 is a view similar to FIGS. 5 and 6 showing the legs in an equally extended position.
Figure 12:
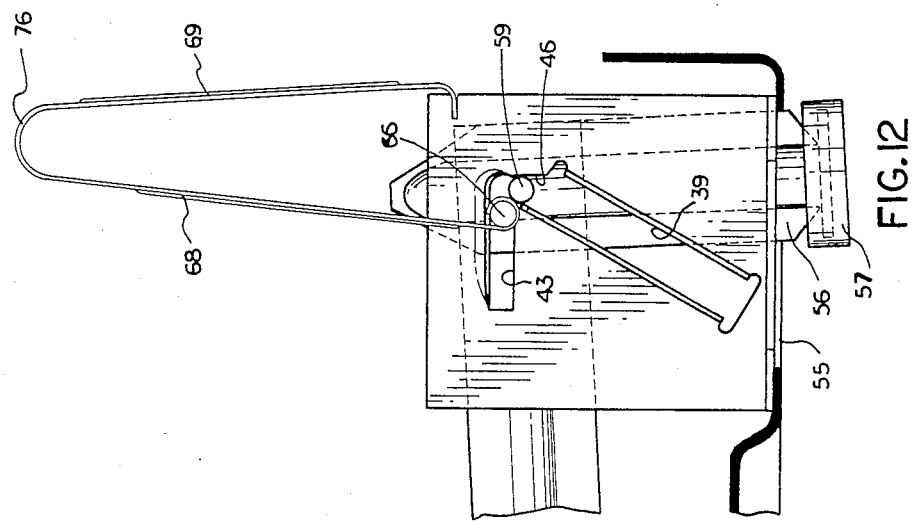
FIG. 12 is a view similar to FIG. 11 with the legs partially extended.
Figure 11:
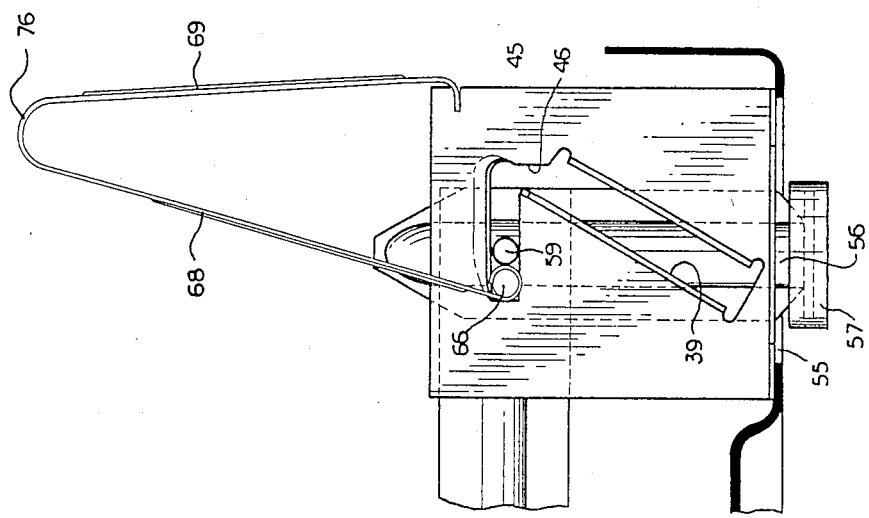
FIG. 11 is an enlarged view of the one end bracket, with the legs in the retracted position.

A particular advantage of the present invention is that the legs can be completely retracted during shipping to ensure that the overall carton height will remain at a minimum. With the present invention the legs will automatically extend themselves when the washing machine is lifted up above the shipping pallet and will move from the stored or retracted position into the operating position. This can best be seen in FIGS. 5, 6, and 7, taken in conjunction with FIGS. 11, 12, and 13. FIG. 5 shows the legs in the retracted position where, in the case of bracket 21, the leg 51 is fully retracted, with the crosspin 54 at the top of slot 39. This is possible only because with the second bracket 22, the leg 56 has been fully retracted by permitting it to move upwardly through the connecting portion 46 into the horizontal slot 43, where it must move toward the inner end 44 against the biasing force applied to the lock pin 66 by spring 68 in order for the other leg 51 to move to its fully retracted position. When the washing machine is lifted off the pallet, there is no longer any upward force on the two legs 51 and 56, so that leg 51 is now free to move downward, with the crosspin 54 riding in slot 29, as shown in FIG. 6. As this occurs, the spacing provided by the connecting bar 61 ensures that the crosspin 59 on leg 56 will then move away from the inner end 44 of slot 43 toward the outer end 45, and this will be assisted by the biasing force applied by spring 68 to the lockpin 66. Thus, as the leg 51 approaches the bottom position, the crosspin 59 on leg 56 reaches the outer end 45 of the slot 43 and is then free to drop through the connecting portion 46 into the sloping slot 39, so that the legs may assume the balanced position shown in FIG. 7.

Figure 13:
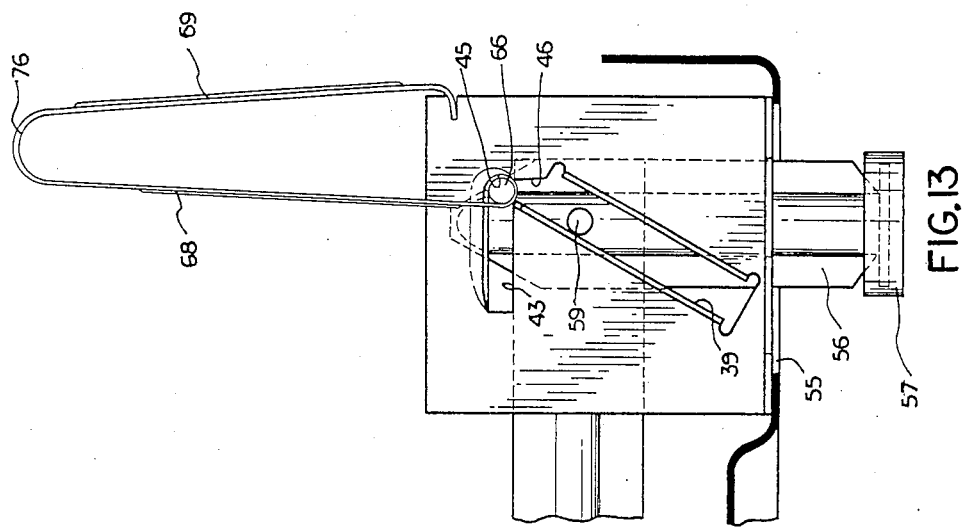
FIG. 13 is a view similar to FIGS. 11 and 12, with the legs fully extended.

As best shown in FIG. 13, when this occurs, spring 68 then moves the lockpin 66 over into the outer end 45 of horizontal slot 43, where it blocks off the connecting portion 46. Thus, no matter how the legs and crosspins are moved with regard to their slots, it is no longer possible for the legs to move back to the retracted position, since the lockpin 66 blocks the upper end of connecting portion 68 so that the crosspin 59 cannot enter the horizontal slot 43.

If it is desired to move the legs into the retracted position as shown in FIG. 5, it is necessary to first move the legs into the position of FIG. 6, with the one leg 51 toward the lowermost position and with the crosspin 54 near the bottom of slot 29. The other leg 56 is thus raised toward the top position with the crosspin 59 toward the top of the slot 39. Further upward movement of leg 56 will allow the crosspin 59 to enter the connecting portion 46. Since the upper end of this slot is blocked by lockpin 66, it is necessary to manually move the inner leg 72 of spring 68 away from the outer leg 69, and thereby move the lockpin 66 toward the inner end 44 of slot 43. This will allow the crosspin 50 to move upward into the horizontal slot 43 and move toward the inner end 43 behind the lockpin 66 as the other leg 51 moves upward and the crosspin 54 moves toward the top of slot 29.

It will thus be seen that the present invention provides a pair of self-leveling rear legs for a household appliance in which the legs can move in such a manner that either leg can extend or contract vertically, with the other leg moving in the opposite direction, while remaining connected to the machine through the brackets 21 and 22 in such a manner as to be capable of supporting the load of the machine. However, the legs may be completely retracted, either manually as described above or in a similar manner when the machine is assembled on a pallet at the factory, and the legs will be self-extending when the machine is lifted off the pallet without any special action such as removal of the lockpin or manual manipulation of any parts by the person unpacking the machine.

While the preferred embodiment of the invention has been shown and described in detial, various modifications and rearrangements may be resorted to without departing from the scope of the invention as defined in the claims.

What is claimed is:

1. A self-leveling leg assembly for a household appliance having a base with adjacent corners along one side, a first bracket secured to said base at one corner, a second bracket secured to said base at the other corner, each of said brackets having at least one vertically extending wall, the wall of said first bracket defining a straight diagonal slot sloping upwardly and outwardly from said second bracket, the wall of said second bracket defining a slot having a first straight diagonal portion sloping upwardly and outwardly from said first bracket and a second straight horizontal portion extending from the top of said first portion toward said first bracket, a first leg carried by said first bracket and having a pin engaging the adjacent slot, a second leg carried by said second bracket and having a pin engaging the adjacent slot, and a connecting bar rigidly secured at its opposite ends to said first and second legs.

2. A self-leveling leg assembly as set forth in claim 1, wherein said connecting bar spaces said legs a distance apart, wherein said legs are in a position wherein said first leg pin is in a position intermediate the ends of its slot, said second leg pin is also in a position intermediate the ends of its slot.

3. A self-leveling leg assembly as set forth in claim 2, wherein said legs are spaced so that when said first leg pin is at the bottom of its slot, said second leg pin is at the top of its diagonal slot portion adjacent the outer end of said horizontal slot portion.

4. A self-leveling leg assembly as set forth in claim 3, including locking means to prevent said second leg pin from moving from said first diagonal slot portion into said second horizontal slot portion.

5. A self-leveling leg assembly as set forth in claim 4, wherein said locking means comprises a third pin in said horizontal slot portion and spring means biasing said third pin toward the outer end of said horizontal slot portion.

6. A self-leveling leg assembly for a household appliance having a base with adjacent corners along one side, a first bracket secured to said base at one corner, a second bracket secured to said base at the other corner, each of said brackets having a pair of parallel spaced vertically extending walls, each of the walls of said first bracket having aligned openings defining a straight diagonal slot sloping upwardly and outwardly from said second bracket, each of the walls of said second bracket having aligned openings defining a slot having a first straight diagonal portion sloping upwardly and outwardly from said first bracket and a second straight horizontal portion extending from the top of said first portion toward said first bracket, a first leg carried by said first bracket between the walls and having a pin extending on each side to engage the adjacent slot, a second leg carried by said second bracket between the walls and having a pin extending on each side to engage the adjacent slot, and a connecting bar rigidly secured at its opposite ends to said first and second legs.

7. A self-leveling leg assembly as set forth in claim 6, wherein said legs are positioned by said connecting bar so that when said first leg is at its extended position with its pin at the bottom of the adjacent slot, said second leg is in the retracted position with its pin at the top of the slot diagonal portion.

8. A self-leveling leg assembly as set forth in claim 7, wherein when said first leg is in the retracted position with its pin at the top of the adjacent slot, said second leg is in the retracted position with its pin in the slot straight horizontal portion.

9. A self-leveling leg assembly as set forth in claim 7, including locking means preventing said second leg pin from moving from said first diagonal slot portion into said second horizontal slot portion.

10. A self-leveling leg assembly as set forth in claim 9, wherein said locking means comprises a third pin in said horizontal slot portion and spring means biasing said third pin toward the outer end of said horizontal slot portion.

11. A self-leveling leg assembly as set forth in claim 10, wherein said spring means comprises a U-shaped leaf spring having one end secured to said third pin and the other end secured to said second bracket.

* * * * *